(12) United States Patent
Solarz

(10) Patent No.: US 9,835,261 B2
(45) Date of Patent: Dec. 5, 2017

(54) CHECK VALVES

(71) Applicant: Hamilton Sundstrand Corporation, Charlotte, NC (US)

(72) Inventor: Bartosz Solarz, Otmuchow (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 14/947,085

(22) Filed: Nov. 20, 2015

(65) Prior Publication Data

US 2016/0146362 A1 May 26, 2016

(30) Foreign Application Priority Data

Nov. 20, 2014 (EP) .................................... 14461590

(51) Int. Cl.
*F16K 15/03* (2006.01)
*F16K 27/02* (2006.01)

(52) U.S. Cl.
CPC ............ *F16K 15/03* (2013.01); *F16K 15/038* (2013.01); *F16K 27/0227* (2013.01)

(58) Field of Classification Search
CPC ..... F16K 15/038; F16K 15/03; F16K 27/0227
USPC ............................................... 137/512.1, 527
See application file for complete search history.

(56) References Cited

U.S. PATENT DOCUMENTS

| | | | |
|---|---|---|---|
| 3,007,488 A | 11/1961 | Wheeler, Jr. | |
| 8,800,596 B2 * | 8/2014 | Kamp | F16K 27/0227 137/512.1 |
| 9,383,023 B2 * | 7/2016 | Kamp | F16K 15/038 |
| 2010/0282340 A1 | 11/2010 | Dehais et al. | |
| 2013/0340862 A1 | 12/2013 | Kamp et al. | |
| 2014/0202562 A1 * | 7/2014 | Kamp | F16K 47/00 137/512.1 |
| 2016/0018012 A1 * | 1/2016 | Kamp | F16K 15/038 16/386 |

* cited by examiner

*Primary Examiner* — Kevin Lee
*Assistant Examiner* — P. Macade Nichols
(74) *Attorney, Agent, or Firm* — Cantor Colburn LLP

(57) ABSTRACT

A check valve comprises a valve housing defining a valve opening and a pair of posts arranged on opposed sides of the valve opening. A hinge pin is mounted between the posts. A pair of flapper elements are pivotally mounted to the hinge pin for rotation between a closed position in which they close the valve opening to prevent fluid flow through the opening, and an open position in which they permit fluid flow through the opening. The check valve further comprises a unitary element having at least one washer portion received on the hinge pin and at least one stop portion for forming a stop for engaging the flapper elements in their open position.

19 Claims, 5 Drawing Sheets

CHECK VALVES

FOREIGN PRIORITY

This application claims priority to European Patent Application No. 14461590.3 filed Nov. 20, 2014, the entire contents of which is incorporated herein by reference.

TECHNICAL FIELD

The present disclosure relates to check valves.

BACKGROUND

Check valves are valves that allow fluid flow in one direction there through and prevent flow in the opposite direction. They are widely used in a range of applications, for example in air conditioning systems, for example in aircraft air conditioning systems.

Check valves commonly include one or more valve elements or flappers located at an opening in a valve housing. The flappers are hingedly supported on a hinge pin mounted to the valve housing for rotation between a closed position in which they lie across and close the opening, preventing fluid flow through the opening in one direction and an open position in which, under the pressure of a fluid (gas or liquid) on one side of the check valve, the flappers rotate from their closed positions so as to allow the fluid to flow through the valve in the opposite direction. Washers are usually provided on the hinge pin in order to assist in locating the flappers on the hinge pin.

Typical check valves also often have one or more physical stops, which limit the angle to which the flappers may open. When the flappers move from the closed to the open position, the flappers hit the stop or stops, thereby preventing the flappers from opening further. An example of such a stop is disclosed in U.S. Pat. No. 8,181,669.

SUMMARY

From one aspect, the present disclosure provides a check valve comprising a valve housing defining a valve opening; a pair of posts arranged on opposed sides of the valve opening; a hinge pin mounted between the posts; a pair of flapper elements pivotally mounted to the hinge pin for rotation between a closed position in which they close the valve opening to prevent fluid flow through the opening, and an open position in which they permit fluid flow through the opening; and at least one unitary element having at least one washer portion received on the hinge pin and at least one stop portion for forming a stop for engaging the flapper elements in their open position.

In the disclosed embodiments of this disclosure, therefore, a unitary element performs the function of both a hinge pin washer and flapper element stop. This may prove advantageous in that it may, for example, reduce the number of parts required in the check valve assembly.

In embodiments, a washer portion may be arranged between adjacent hinge portions of the flapper elements. In some embodiments, two or more washer portions may be provided between adjacent hinge portions of the flapper elements. In other embodiments, a washer portion may be provided between the hinge portion of a flapper element and an adjacent post, for example between respective ends of the flapper elements and the adjacent posts. In some embodiments, washer portions are provided in both locations.

The or each unitary element may have just a single washer portion and a single stop portion. The stop portion may extend away from the washer portion. A plurality of discrete unitary elements may be provided along the hinge pin.

The stop portion may take any suitable form. In a simple embodiment, the stop portion may comprise a pair of opposed stop surfaces, one for engaging a respective one of the flapper elements.

In order to provide for a relatively large contact area with the flapper elements, in some embodiments the stop surfaces may be formed on elongate arms. Thus in some embodiments, the unitary element may be generally Y-shaped, with the lower limb providing the washer portion and the opposed upper limbs providing the stop portion.

In order to locate the unitary element or elements, a locating element, for example a locating pin, may also be mounted between the posts, and the unitary element be provided with a location opening for receiving the locating pin. In embodiments where a plurality of unitary elements is provided, one or more spacer elements may be provided on the locating element between the unitary elements.

In other embodiments, a unitary element may comprise more than one washer portion and/or stop portion. For example, the unitary element may comprise multiple washer portions and multiple stop portions.

In one embodiment, the unitary element may comprise an elongate medial portion, with one or a plurality of washer portions arranged on one side of the medial portion and one or a plurality of stop portions arranged on the opposite side of the medial portion.

The stop portions may be connected by one or more bridging elements, for example joining end portions of the stop elements. In one embodiment, the ends of stop portions are connected by an arcuate bridging element.

The end portions of the medial portion may be suitably mounted in the posts. For example, the posts may have upwardly open slots for receiving the end portions of the medial portion.

Some embodiments of the disclosure will now be described by way of example only.

DETAILED DESCRIPTION

Figure 1:
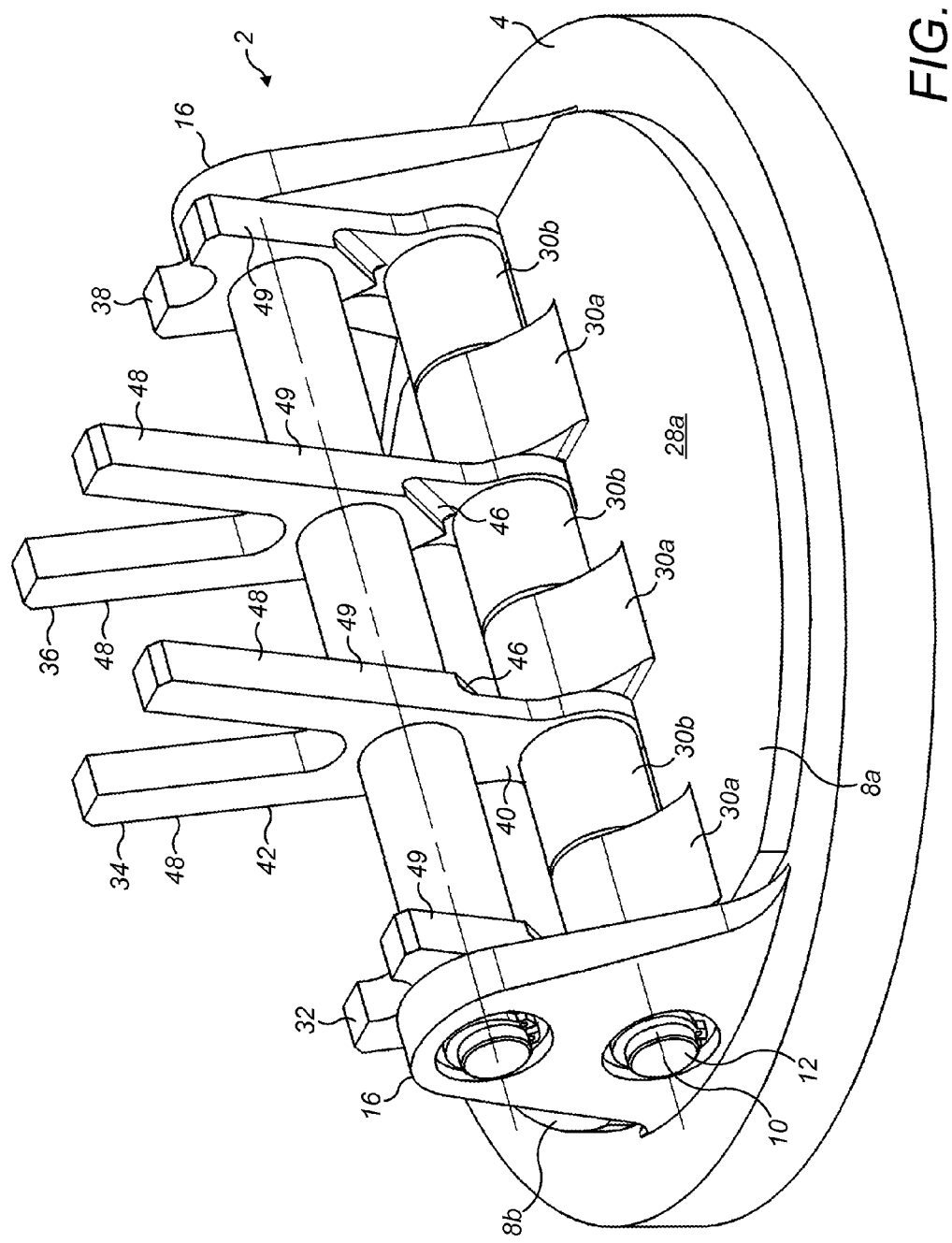
FIG. 1 shows a perspective view of a first embodiment of check valve in accordance with this disclosure.
Figure 2:
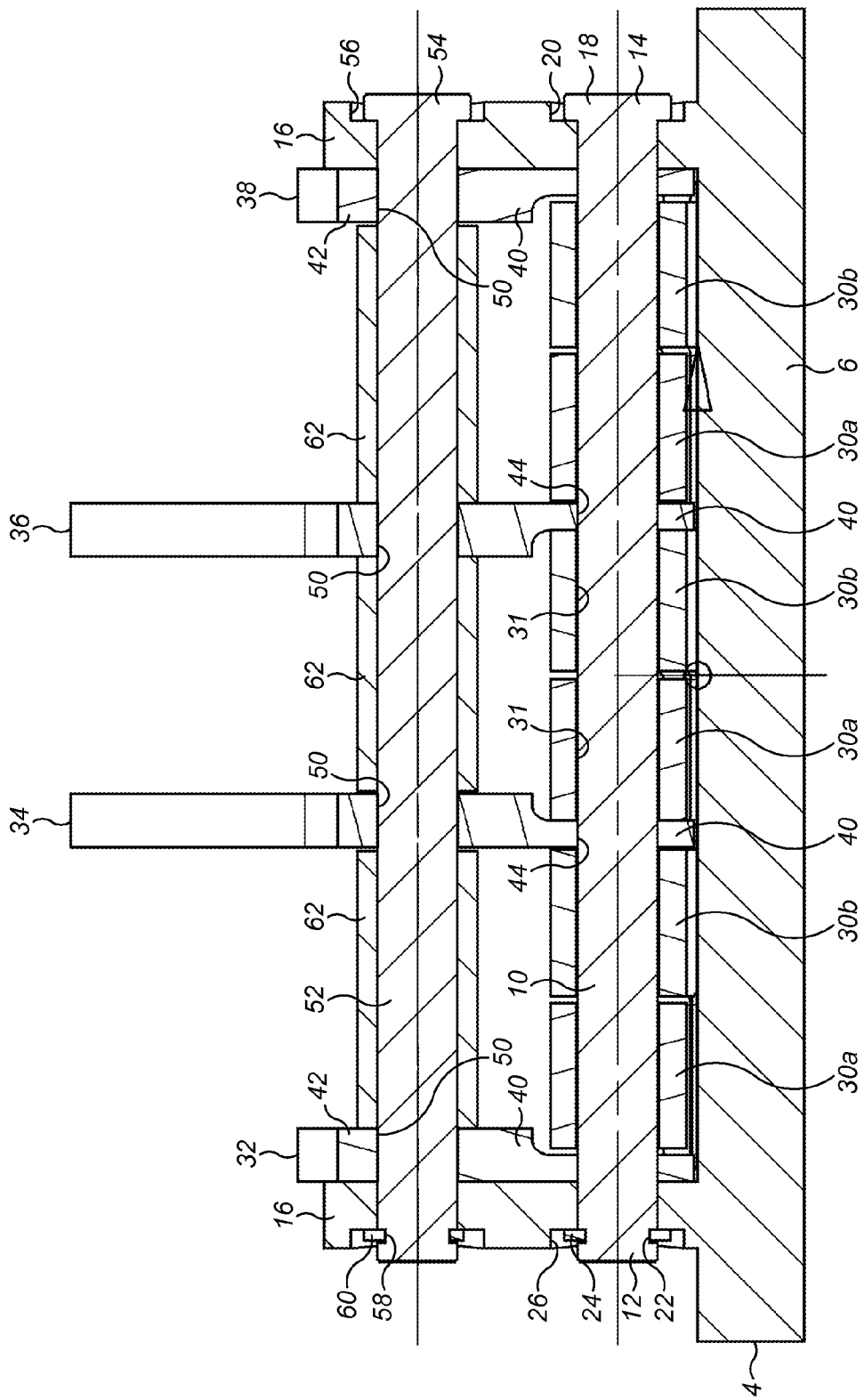
FIG. 2 shows a vertical section through the check valve of FIG. 1.

With reference firstly to FIGS. 1 and 2, a first embodiment of check valve 2 in accordance with this disclosure is illustrated.

The check valve 2 comprises a valve housing 4. The valve housing 4 defines an opening there through in form of two generally D-shaped apertures (not shown) separated by a central web 6 of the housing (see FIG. 2). The opening is closed by a pair of flapper elements 8a, 8b which are mounted on a hinge pin 10 which is mounted at its ends 12, 14 to a pair of posts 16 which extend upwardly from the valve housing 4 on opposed sides of the valve opening. In the illustrated embodiments, the posts 16 are formed integrally with the valve housing 4, although in other embodiments they may be formed as separate components and suitably attached to the valve housing 4.

As can be seen from FIG. 2, the hinge pin 10 is provided with an enlarged head 18 at one end 14, the enlarged head 18 being received within a bore 20 formed in one of the posts 16. The other end 12 of the hinge pin 10 is formed with a circumferential groove 22 which receives a circlip 24 which is received in a bore 26 in the other mounting post 16. The circlip 24 retains the hinge pin 10 to the posts 16.

Each flapper element 8a, 8b comprises a generally D-shaped planar portion 28a, 28b which closes the respective valve opening, and a number of mounting lugs 30a, 30b having bores 31 formed there through to receive the hinge pin 10. In the illustrated embodiment, each flapper element 8a, 8b is provided with three mounting lugs 30a, 30b, although any number of mounting lugs 30a, 30b may be provided on each flapper element 8a, 8b.

The check valve 2 further comprises a plurality, in this case four, unitary washer/stop elements 32, 34, 36, 38. In this case a pair of inner unitary stop/washer elements 34, 36 is provided symmetrically between two sets of adjacent lugs 30a, 30b of respective flapper elements 8a, 8b on either side of the check valve centerline. A second pair of outer, unitary washer/stop elements 32, 38 is provided between the outermost lugs 30a, 30b of the respective flapper elements 8a, 8b and the posts 16. The respective inner unitary elements 34, 36 and outer unitary elements 32, 38 are mirror images of one another. It will be understood that the terms "inner" and "outer" used in this context refer to the relative positions along the length of the hinge pin 10, the inner unitary elements 34, 36 being nearer the middle of the hinge pin 10 and the outer unitary elements 32, 38 being nearer the ends of the hinge pin 10. The respective unitary elements 32, 34, 36, 38 are arranged parallel to one another.

The unitary elements may, for example, be made from a low friction material such as Stellite (which may be useful in high temperature applications) or even aluminum or composite material, for example a fibre or carbon fibre composite material, having a metallic or polymeric matrix (for lower temperature applications). An example composite material would be a carbon filled PEEK (polyether ether ketone).

Each of the inner unitary washer/stop elements 34, 36 is generally Y-shaped having a lower, washer portion 40 and an upper, stop portion 42. The washer portion 40 is received between the mounting lugs 30a, 30b of the flapper elements 8a, 8b and has a bore 44 which is received over the hinge pin 10. As can be seen in FIG. 1, the washer portion 40 is less wide than the stop forming portion 42, being provided with relief pockets 46 formed on opposed sides thereof.

The upper, stop portion 42 comprises a pair of opposed limbs 48, each having a stop surface 49. The limbs 48 are angled such that they will receive the planar portions 28 of the flapper elements 8a, 8b along the entire length of the stop surface 49 when the flapper elements 8a, 8b move to the open condition so as to maximize the surface area of contact between the flapper elements 8a, 8b and the stop portion 42. The limbs 48 are also sized such as to engage substantially along the entire height of the planar section 28a, 28b of the flapper elements 8a, 8b. This minimizes the impact loading on the flapper elements 8a, 8b.

The inner unitary elements 34, 36 also comprise a bore 50 at the lower end of the stop portion 42 which receive a locating pin 52 which is mounted to the posts 16 vertically above the hinge pin 10. The locating pin 52 has a similar construction to that of the hinge pin 10 having an enlarged head 54 received in a counterbore 56 of one post 16 and a groove 58 receiving a circlip 60 at the other end of the locating pin 52 for retaining the locating pin 52 in the check valve 2.

The outer unitary stop/washer elements 32, 38 also comprise a lower, washer portion 40 and an upper, stop portion 42. The washer portion 40 of the outer unitary elements 32, 38 are similar to those of the inner elements 34, 36, having a bore 44 receiving the hinge pin 10.

The stop portion 42 of each of the outer unitary elements 32, 38 is, however, shorter than the stop portion 42 of the inner unitary elements 34, 36. Thus, as can be seen for example in FIG. 1, the outer unitary elements 32, 38 have a truncated stop section 42 compared to the stop section 42 of the inner elements 34, 36. This is because the flapper elements 8a, 8b are shorter at their ends than at their middle, meaning that there need only be a smaller contact area provided by the stop portion 42.

It will be understood that the stop surfaces 49 of the respective stop portions 42 on the respective unitary elements 32, 34, 36, 38 will be arranged parallel to and coplanar with one another so as to engage the planar portion 28a, 28b of the respective flapper elements 8a, 8b.

The outer unitary elements 32, 38 also comprise a bore 50 received on the locating pin 52, similarly to the inner unitary elements 34, 36. In addition, a plurality of spacing elements 62 are received on the locating pin 52 between adjacent unitary stop/washer elements 32, 34, 36, 38. Whilst these spacers 62 are not essential, they may assist in locating the unitary stop/washer elements 32, 34, 36, 38.

In the above embodiment, a plurality of discrete, unitary stop/washer elements 32, 34, 36, 38 are used. However, it may be possible to integrate two or more of these elements. The embodiments of FIGS. 3 to 6 illustrate alternative arrangements in which a single unitary body incorporates multiple washer portions and stop portions.

Figure 3:
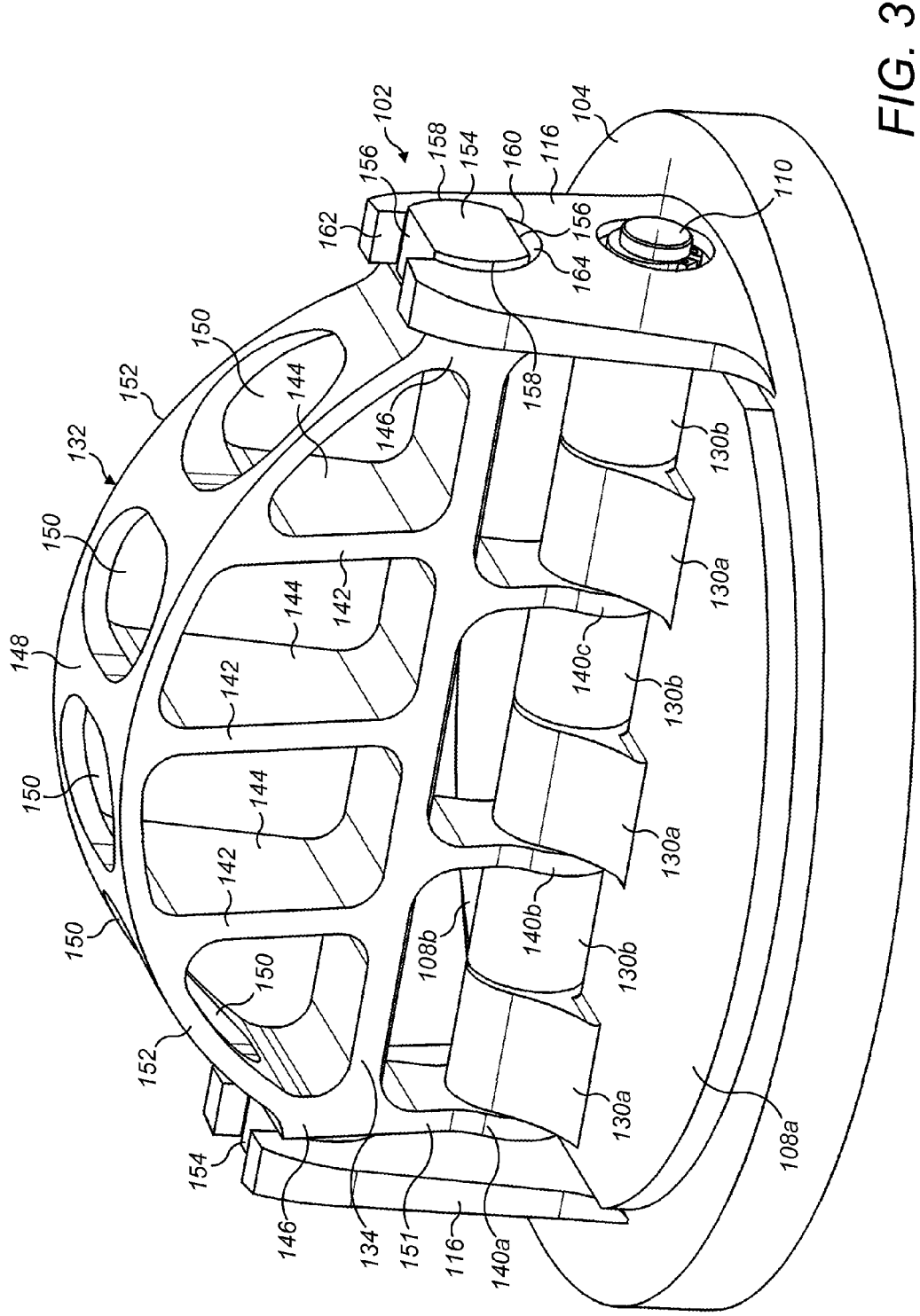
FIG. 3 shows a perspective view of a second embodiment of check valve in accordance with this disclosure.
Figure 4:
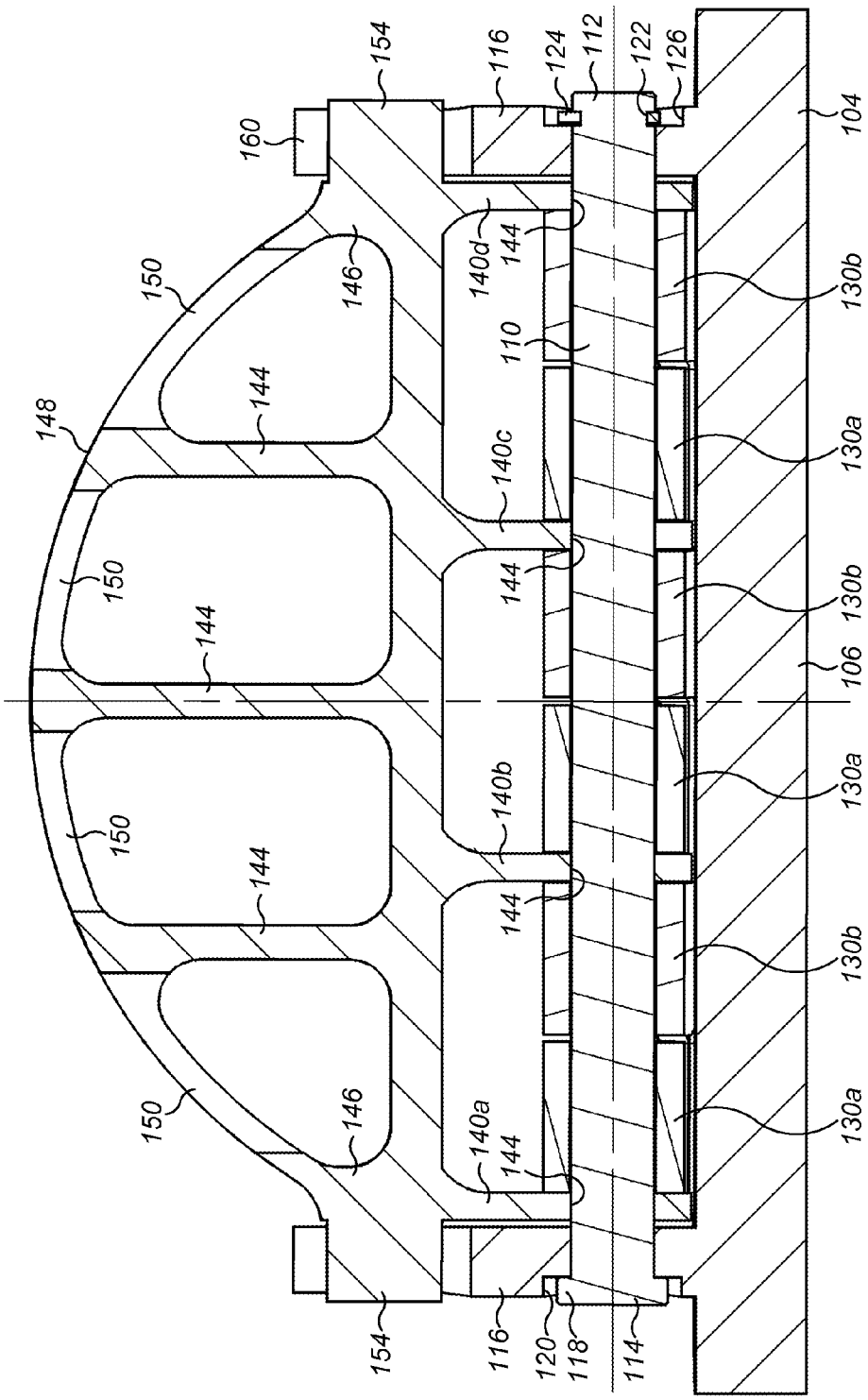
FIG. 4 shows a vertical cross-section through the embodiment of FIG. 3.

With reference to FIGS. 3 and 4, a second embodiment of check valve 102 is illustrated.

Similarly to the check valve 2 of the first embodiment, the check valve 102 comprises a valve housing 104. The valve housing 104 defines an opening there through in form of two generally D-shaped apertures (not shown) separated by a central web 106 of the housing (see FIG. 4). The opening is closed by a pair of flapper elements 108a, 108b which are mounted on a hinge pin 110 which is mounted at its ends 112, 114 to a pair of posts 116 which extend upwardly from the valve housing 104 on opposed sides of the valve opening. In the illustrated embodiments, the posts 116 are formed integrally with the valve housing 4, although in other embodiments they may be formed as separate components and suitably attached to the valve housing 104.

As can be seen from FIG. 4, the hinge pin 110 is provided with an enlarged head 118 at one end 114, the enlarged head 118 being received within a bore 120 formed in one of the posts 116. The other end 112 of the hinge pin 110 is formed with a circumferential groove 122 which receives a circlip 124 which is received in a bore 126 in the other mounting post 116. The circlip 124 retains the hinge pin 110 to the posts 116.

Each flapper element 108a, 108b comprises a generally D-shaped planar portion 128a, 128b which closes the respective valve opening, and a number of mounting lugs 130a, 130b having bores 131 formed there through to receive the hinge pin 110. In the illustrated embodiment, each flapper element 108a, 108b is provided with three mounting lugs 130*a*, 130*b*, although any number of mounting lugs 130*a*, 130*b* may be provided on each flapper element 108*a*, 108*b*.

To this extent the check valve 102 of the second embodiment is similar to that of the first embodiment. However, the check valve 102 differs from the check valve 2 in other respects.

In particular, instead of having multiple discrete unitary washer/stop elements 32, 34, 36, 38, the check valve 102 of the second embodiment has a single unitary washer/stop element 132.

The unitary washer/stop element 132 comprises a medial rib 134 having a plurality of washer portions 140 extending downwardly therefrom, and a plurality of stop portions 142 extending upwardly therefrom. In this embodiment, the washer portions 140 are arranged parallel to one another and comprise a pair of outer washer portions 140*a*, 140*d* which are arranged between mounting lugs 130*a*, 130*b* and the adjacent posts 116 and a pair of inner washer portions 140*b*, 140*c* between adjacent mounting lugs 130*a*, 130*b*. The shape of each of the washer portions 140 is the same. Each washer portion 140 is formed with a bore 144 for receiving the hinge pin 110.

The upper, stop portions 142 comprise three generally parallel, inner diverging limbs 144 and a pair of outer limbs 146. More or less inner limbs 144 may be provided in other embodiments, and their lateral positions may be different from those illustrated.

The outer ends of the limbs 144, 146 are joined by an arcuate bridging element 148. To reduce weight, apertures 150 are provided in the bridging element 148.

The side surfaces of the inner and outer limbs 144, 146, the bridging element 148, the medial rib 134 and an upper portion 151 of the washer elements 140*a*, 140*b* together form diverging planar stop surfaces 152 which will receive the planar portions 128*a*, 128*b* of the flapper elements 108*a*, 108*b* when the flapper elements 108*a*, 108*b* are in the open position, thereby providing a very large area of contact between the stop surfaces and the flapper elements 108*a*, 108*b*, thereby reducing impact forces on the flapper elements 108*a*, 108*b*. The bridging element 148 may have a curvature similar to the outer portion of the flapper elements 108*a*, 108*b*, such that it engages around a peripheral portion of the flapper elements 108*a*, 108*b*.

It will also be seen that the unitary element 132 is provided with a pair of lugs 154 formed generally at the ends of the medial rib 134. Each lug 154 has a pair of parallel flat surfaces 156 connected by circularly arcuate surfaces 158. Each lug 154 is received in a keyhole shaped slot 160 in a respective post 116.

The keyhole shaped slot 160 has a straight entrance portion 162 and a circular receiving portion 164. The unitary element 132 will be mounted by aligning the parallel flat surfaces 156 with the entrance portion 162 of the slots 160, moving the lugs 154 fully into the slots 160 and rotating the unitary element 132 through 90° to the position shown in FIG. 3 so as to engage the arcuate surfaces 158 of the lugs with the circular receiving portion 164. The hinge pin 110 can then be inserted through the posts 116 and mounting lugs 130*a*, 130*b* and secured in position. The interaction between the lugs 154 and the slots 160 will assist in retaining the unitary element 132 in position.

The unitary element 132 may be made from any suitable material, for example Nitronic 60®, an austenitic stainless steel having good anti-galling properties. The unitary element may be formed by sintering for example.

This embodiment may have the advantage of potentially providing an increased stop surface area compared to the first embodiment.

Figure 5:
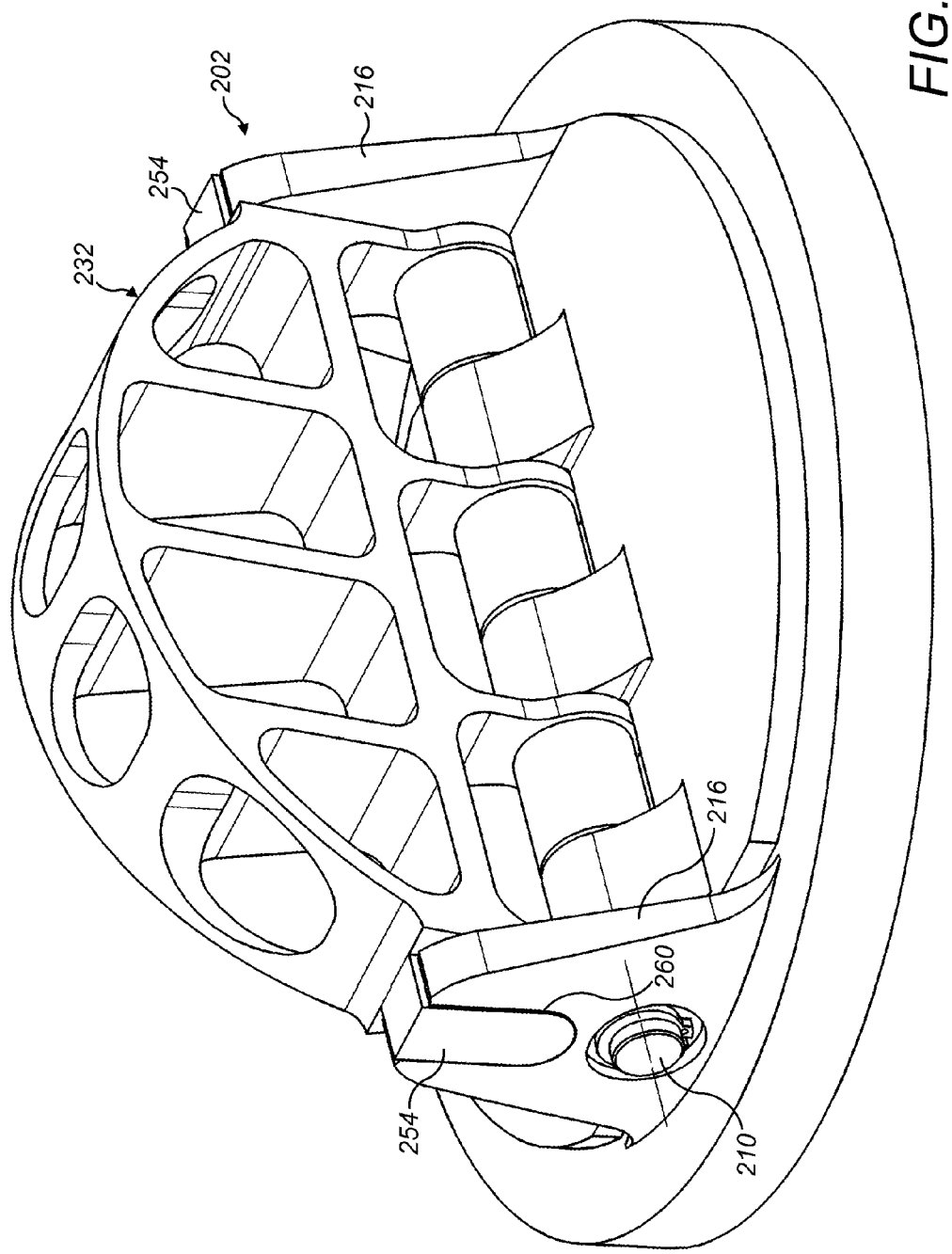
FIG. 5 shows a perspective view of a third embodiment of check valve in accordance with this disclosure.

Turning now to FIG. 5, a modification of the embodiment of FIGS. 3 and 4 is illustrated. The only difference between these embodiments is the manner in which the unitary element is mounted. For this reason the detail of the check valve 202 which is common with that of the check valve 102 will not be described, only the differences.

In this embodiment, the unitary element 232 of the check valve 202 is also provided with lugs 254 which engage within slots 260 in posts 216. However, lugs 254 are generally U shaped and received within U-shaped slots 260. Thus in this embodiment the unitary element 232 is retained solely by the hinge pin 210, with the lugs 254 simply acting to locate, rather than retain, the unitary element 232.

It will be understood that a potential advantage of the illustrated embodiments is that a unitary element may be used to perform both the function of a washer and a stop element. This may reduce the number of components required in assembly of the check valve.

Moreover, the components may be made from any suitable material. For example the unitary elements may be made from a low friction or low-galling material such as Stellite, aluminum, a composite material, for example a fibre or carbon fibre composite material, having a metallic or polymeric matrix, or Nitronic 60®. An example composite material would be a carbon filled PEEK (polyether ether ketone). The material of the unitary element may therefore be optimised for its intended purpose, rather than being determined by another component of the check valve.

The above description is of specific embodiments only and it will be appreciated that variations may be made to the embodiments without departing from the broad scope of the disclosure as defined by the following claims.

The invention claimed is:

1. A check valve comprising:
 a valve housing defining a valve opening;
 a pair of posts arranged on opposed sides of the valve opening;
 a hinge pin mounted between the posts;
 a pair of flapper elements pivotally mounted to the hinge pin for rotation between a closed position in which they close the valve opening to prevent fluid flow through the opening, and an open position in which they permit fluid flow through the opening; and
 at least one unitary element having at least one washer portion received on the hinge pin and at least one stop portion for forming a stop for engaging the flapper elements in their open position.

2. A check valve as claimed in claim 1, wherein the washer portion is provided between adjacent hinge portions of the flapper elements.

3. The check valve as claimed in claim 1, wherein the or each unitary element comprises just a single washer portion and a single stop portion.

4. The check valve as claimed in claim 3, comprising a plurality of discrete unitary elements provided along the hinge pin.

5. The check valve as claimed in claim 1, wherein the stop portion comprises a pair of opposed stop surfaces, each one for engaging a respective flapper element.

6. The check valve as claimed in claim 5, wherein the stop surfaces are formed on elongate arms.

7. The check valve as claimed in claim 6, wherein the unitary element is generally Y-shaped, with the lower limb providing the washer portion and the opposed upper limbs providing the stop portion.

8. The check valve as claimed in claim 1, further comprising a locating element mounted to the posts, the unitary element having an opening for receiving the locating element.

9. The check valve as claimed in claim 1, wherein the unitary element comprises more than one washer portion and/or stop portion.

10. The check valve as claimed in claim 9, wherein the unitary element comprises an elongate medial portion, with a plurality of washer portions arranged on one side of the medial portion and a plurality of stop portions arranged on the opposite side of the medial portion.

11. The check valve as claimed in claim 10, wherein the stop portions are connected by one or more bridging elements.

12. The check valve as claimed in claim 11, wherein the bridging elements are joining ends of the stop portions.

13. The check valve as claimed in claim 12, wherein the joining ends of the stop portions are connected by an arcuate bridging element.

14. The check valve as claimed in claim 13, wherein end portions of the unitary element are mounted in the posts.

15. The check valve as claimed in claim 14, wherein the posts include upwardly open slots for receiving the end portions of the unitary element.

16. The check valve as claimed in claim 2, wherein two or more washer portions are provided between adjacent hinge portions of the flapper elements.

17. A check valve comprising:
a valve housing defining a valve opening;
a pair of posts arranged on opposed sides of the valve opening;
a hinge pin mounted between the posts;
a pair of flapper elements pivotally mounted to the hinge pin for rotation between a closed position in which they close the valve opening to prevent fluid flow through the opening, and an open position in which they permit fluid flow through the opening; and
at least one unitary element having at least one washer portion received on the hinge pin and at least one stop portion for forming a stop for engaging the flapper elements in their open position;
wherein a washer portion is provided between a hinge portion of a flapper element and an adjacent post.

18. The check valve as claimed in claim 17, wherein the washer portion is provided between respective ends of the flapper elements and the adjacent posts.

19. A check valve comprising:
a valve housing defining a valve opening;
a pair of posts arranged on opposed sides of the valve opening;
a hinge pin mounted between the posts;
a pair of flapper elements pivotally mounted to the hinge pin for rotation between a closed position in which they close the valve opening to prevent fluid flow through the opening, and an open position in which they permit fluid flow through the opening; and
at least one unitary element having at least one washer portion received on the hinge pin and at least one stop portion for forming a stop for engaging the flapper elements in their open position;
a locating element mounted to the posts, the unitary element having an opening for receiving the locating element; and
one or more spacer elements provided on the locating element between adjacent unitary elements.

* * * * *